US006898523B2

(12) United States Patent
Cochlovius et al.

(10) Patent No.: US 6,898,523 B2
(45) Date of Patent: May 24, 2005

(54) MOTOR VEHICLE NAVIGATION SYSTEM WITH ENHANCED MAP SELECTION

(75) Inventors: Elmar Cochlovius, Villingen-Schwenningen (DE); Oliver Wagner, Hildesheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/292,373

(22) Filed: Nov. 12, 2002

(65) Prior Publication Data
US 2003/0120423 A1 Jun. 26, 2003

(30) Foreign Application Priority Data
Nov. 12, 2001 (DE) .......................................... 101 55 549

(51) Int. Cl.⁷ ................................................ G09G 5/00
(52) U.S. Cl. .................... 701/212; 707/513; 340/995; 345/156; 345/204; 345/173; 382/232
(58) Field of Search ................................ 701/200, 212, 701/211, 208; 707/513; 340/990, 988, 997, 995.1, 995.15, 995; 345/428, 439, 353, 357, 204, 735, 156, 173; 382/232

(56) References Cited

U.S. PATENT DOCUMENTS

| 5,559,707 A | | 9/1996 | DeLorme et al. ........... 364/443 |
| 5,757,359 A | * | 5/1998 | Morimoto et al. .......... 345/156 |
| 6,037,936 A | * | 3/2000 | Ellenby et al. ............. 345/764 |
| 6,138,072 A | * | 10/2000 | Nagai .......................... 701/207 |
| 6,178,380 B1 | * | 1/2001 | Millington ................... 701/212 |
| 6,202,026 B1 | | 3/2001 | Nimura et al. .............. 701/211 |
| 6,452,570 B1 | | 9/2002 | Kuenzner ....................... 345/7 |
| 6,587,787 B1 | * | 7/2003 | Yokota ........................ 701/212 |
| 6,697,734 B1 | * | 2/2004 | Suomela ..................... 701/212 |
| 2003/0018427 A1 | * | 1/2003 | Yokota et al. ............... 701/208 |

FOREIGN PATENT DOCUMENTS

| DE | 0849563 | 6/1998 |
| DE | 19841262 | 3/2000 |
| EP | 0897169 | 2/1999 |
| JP | 10340045 A | * 12/1998 |
| JP | 2000352927 | 12/2000 |

* cited by examiner

Primary Examiner—Thomas G. Black
Assistant Examiner—Tuan C To
(74) Attorney, Agent, or Firm—O'Shea, Getz & Kosakowski, P.C.

(57) ABSTRACT

To facilitate the operation of an in-vehicle navigation system and to shorten the time required for the otherwise time-consuming entering of the destination by crosshairs by reducing the operating steps required, a general map and an enlarged portion of the general map are displayed simultaneously on a screen. A navigation computer calculates the routes. Map data from general maps and detail maps are stored in a memory. A main computer calculates the portion selectable for example by crosshairs and shown on an enlarged scale, from the data stored in the memory. The general map and the enlarged portion can be moved synchronously with one another on the screen by a graphic control unit.

21 Claims, 4 Drawing Sheets

MOTOR VEHICLE NAVIGATION SYSTEM WITH ENHANCED MAP SELECTION

BACKGROUND OF THE INVENTION

The present invention relates to the field of motor vehicle navigation systems, and in particular to a technique for selecting a destination from a map image displayed on a display device to compute a route to a selected destination.

Known navigation systems offer the user the option of displaying a road map on a screen and moving it in all four directions of the compass (i.e., N, S, E, and W), as well as all four intercardinal points (i.e., NW, NE, SE and SW). This function is often referred to as scrolling or as a scroll function. The user can select a portion of the map displayed on the screen and then, by switching from the scroll function to the zoom function, the selected portion of the map is displayed on a larger scale in place of the map previously displayed. However, searching for a destination on the map and preparation of a route requires frequent switching between the scroll function and the zoom function of the navigation system, which is cumbersome and time-consuming for the user.

Therefore, there is a need for an improved technique for selecting a destination from a display in a motor vehicle navigation system.

SUMMARY OF THE INVENTION

Briefly, according to an aspect of the invention, in a motor vehicle navigation system a general map is presented on a display, and a portion of the displayed general map is selected by the user for display in an enlarged scale. The user may select the portion of the displayed general map for enlargement with a movable pointing device (e.g., crosshairs, a cursor, et cetera). An image of the selected portion is then displayed on the screen to the user at the same time as the general map, and the selected portion is displayed in a scale that is more detailed than the general map.

Map data from larger- and smaller-scale maps stored in a memory device, are selected by a movable pointing device (e.g., crosshairs, a cursor, et cetera) from a smaller-scale general map displayed on the screen, and are displayed on the screen on an enlarged scale at the same time as the general map.

The navigation system includes an operating unit (i.e., an interface unit) that allows an operator to operate the system. The operator can select a portion of a map shown on the screen and display it on the screen in a larger scale. This selected portion is either superimposed in position on the on-screen map or shown in a "help window" above, below, or beside the general map displayed on the screen.

Storing data associated with smaller- and larger-scale maps in the memory, allows the general map and the selected portion to be displayed simultaneously on the screen. The selected portion of the map is a more detailed map image in comparison to the general map image. Switching between the scroll function and the zoom function, which is time-consuming and burdensome for the operator, is no longer necessary. Instead, the operator can simultaneously view the general map and the more detailed portion selected by the zoom function. In addition, the general map and the selected portion can be moved synchronously with each other in all eight directions of the compass, with the zoom center advantageously coinciding with the original point of intersection of the crosshairs. The idea is to display the point of intersection—and the roads in the immediate vicinity—of the "old" crosshairs as an additional view at the same time and in position "on" the general map or separately in a help window.

One embodiment of the navigation system includes a navigation unit, a screen control unit, an operating unit and a display screen. The navigation unit includes a navigation computer that calculates routes. The screen control unit includes memory to store map data of larger- and smaller-scale maps. The screen control unit also includes a main computer and a graphics control unit that process map data to provide the map images for simultaneous display on the screen. The screen control unit and the navigation computer are interconnected via a data bus.

In a preferred embodiment, the screen control unit includes a screen memory that is divided into two levels. Map data for the area of the general map to be displayed are stored in one level, while the maps for the enlarged section are stored in the other level. The graphic control unit generates the images on the screen from the map data stored in the two levels.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
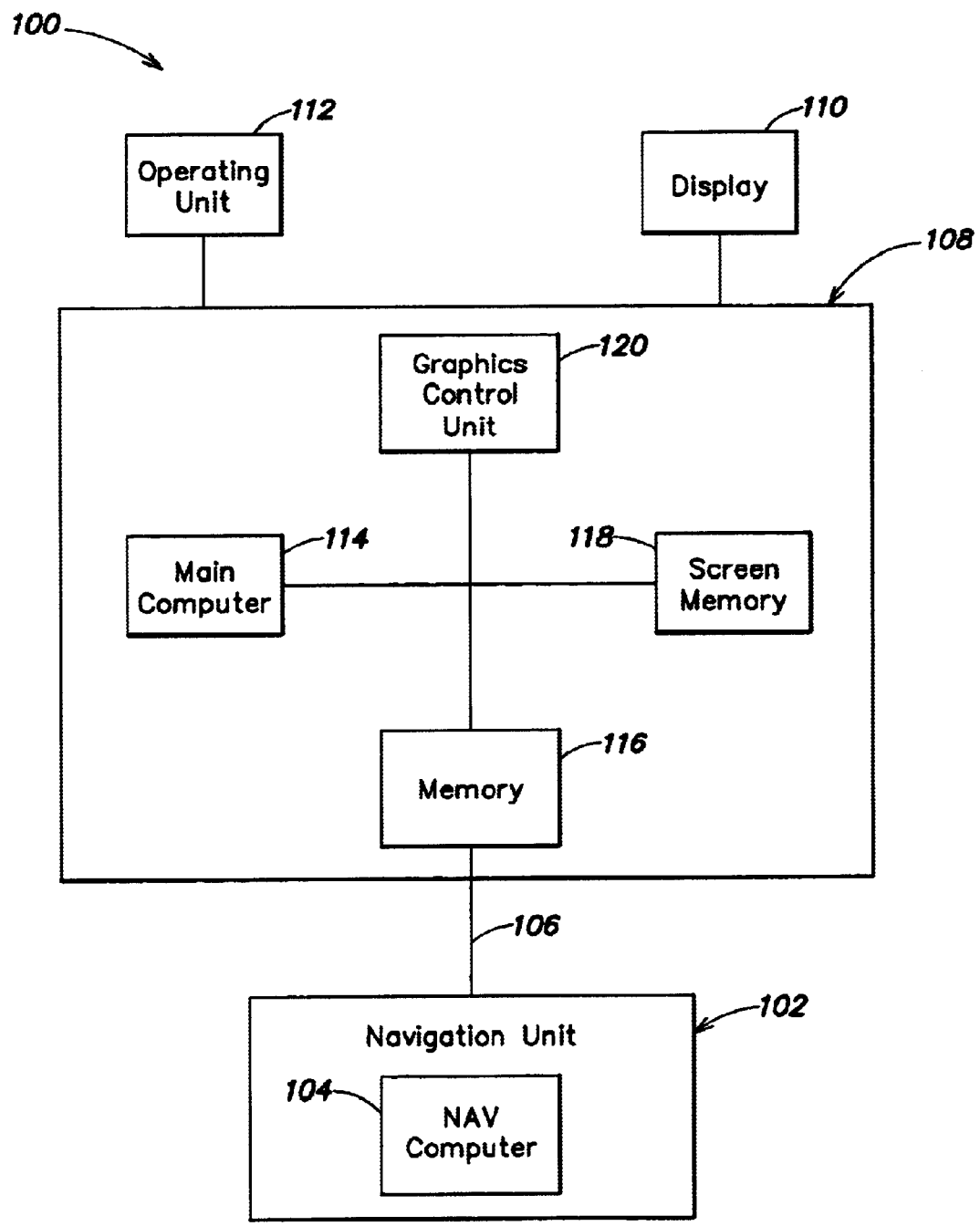
FIG. 1 is a block diagram of one embodiment of a motor vehicle navigation system.

FIG. 1 is a block diagram of one embodiment of a motor vehicle navigation system 100. The system includes a navigation unit 102, which includes a navigation computer 104, and is connected via a data bus 106 to a screen control unit 108. The navigation unit 102 also includes a position locating device, such as for example, a GPS receiver. The screen control unit 108 provides display data to a display 110, and receives input commands from an operating unit 112, which includes for example a cursor/cross hair control mechanism. The screen control unit 108 includes a main computer 114, a memory 116, a screen memory 118, and a graphic control unit 120, which are operably connected within the screen control unit 108.

Figure 2:
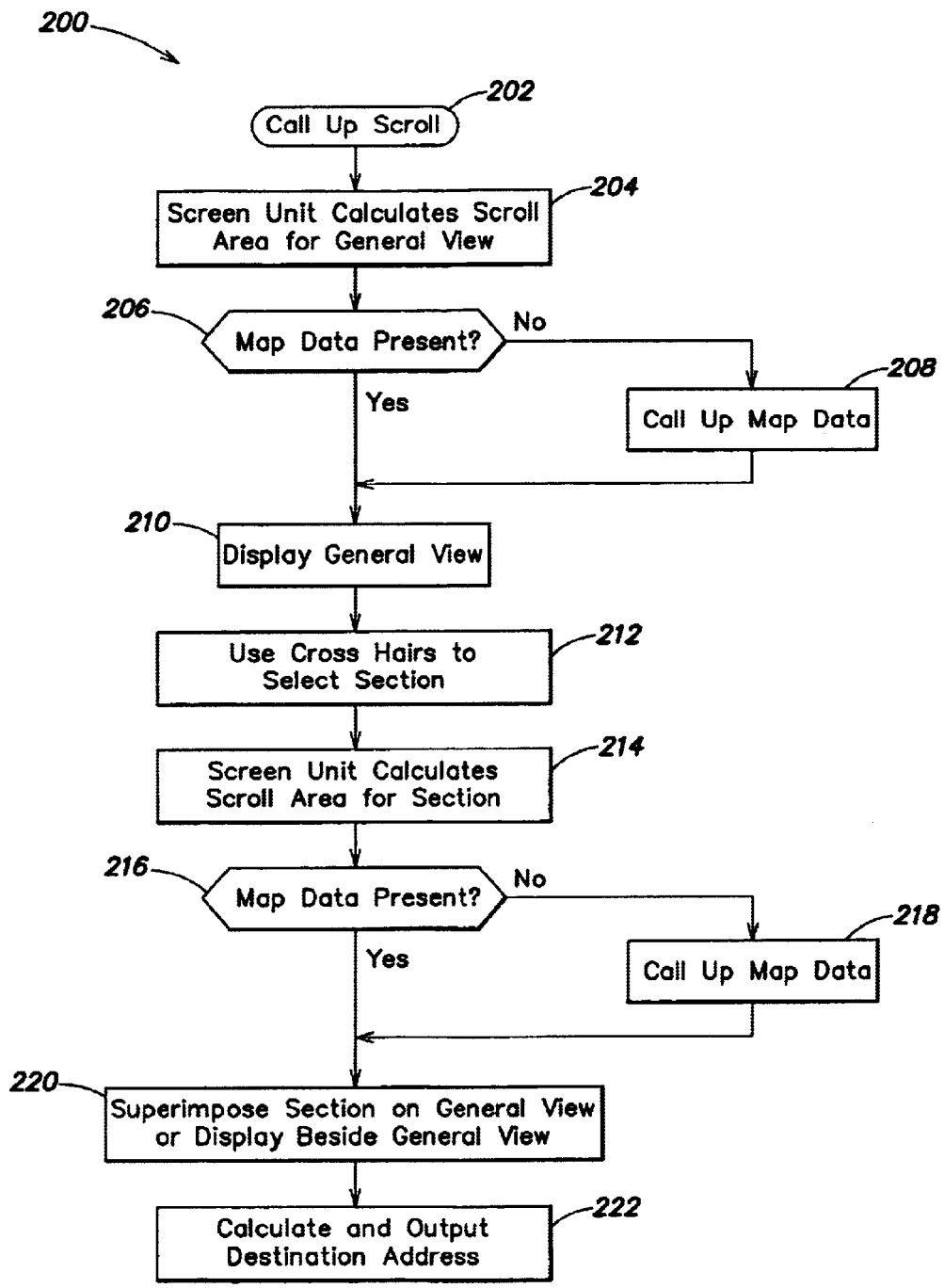
FIG. 2 is a flowchart illustration of processing steps performed by the navigation system of FIG. 1.
Figure 3:
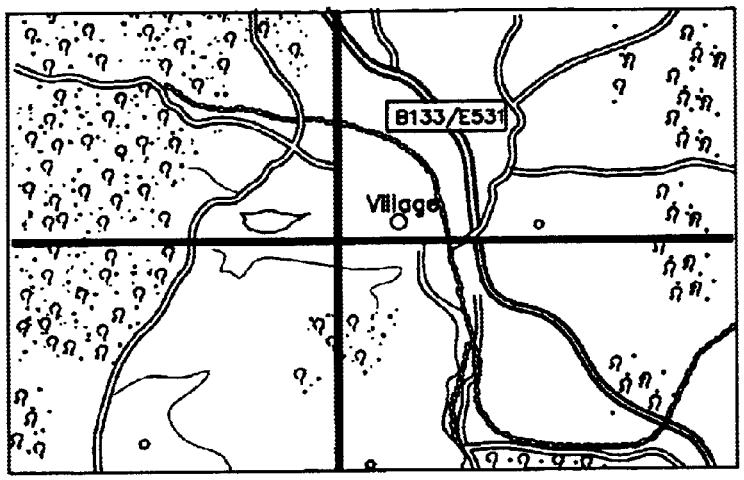
FIG. 3 is a general map with crosshairs according to the prior art.

FIG. 2 is a flow chart illustration of processing steps 200 performed by the navigation system 100 (FIG. 1). Once the operator has called up a general map in step 202 using the operating unit 112 (FIG. 1), in step 204 the main computer 114 (FIG. 1) determines the area to be displayed on the display screen 110 (FIG. 1). Step 206 is then performed to determine if the map data for the image to be displayed is present. If it is not, then the data is retrieved from the memory 116 in step 208. Step 210 is then performed to display the general view on the display screen 110 (FIG. 1).

The operator then controls a movable pointing device (e.g., crosshairs, a cursor, et cetera) displayed on the display 110 to select, in step 212, a portion of the general map that is currently being displayed for display on an enlarged scale (i.e., to be zoomed in on). Once the portion of the general map image has been selected in step 212, data indicative of the selected map location is then used in step 214 to generate a zoomed-in image indicative of the selected map location. Specifically, using data from the memory 116, the main computer 114 calculates the selected section to be shown in more detail on the screen 110, as show in FIG. 4. If the map data for the selected section is not available in step 216, the map data is retrieved from the memory 116 in step 218.

Figure 4:
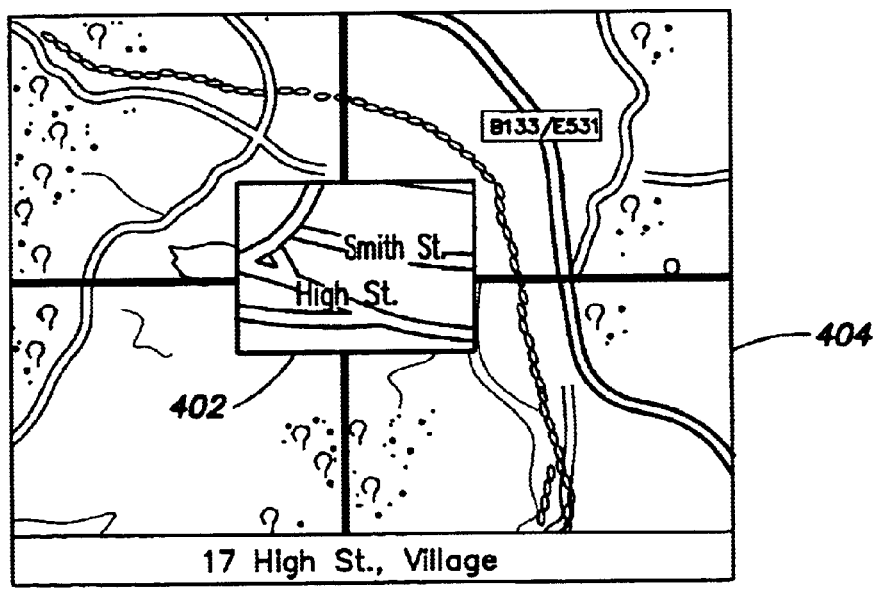
FIG. 4 is a pictorial illustration of a display screen that includes an enlarged selected map section superimposed over a portion of general map.
Figure 5:
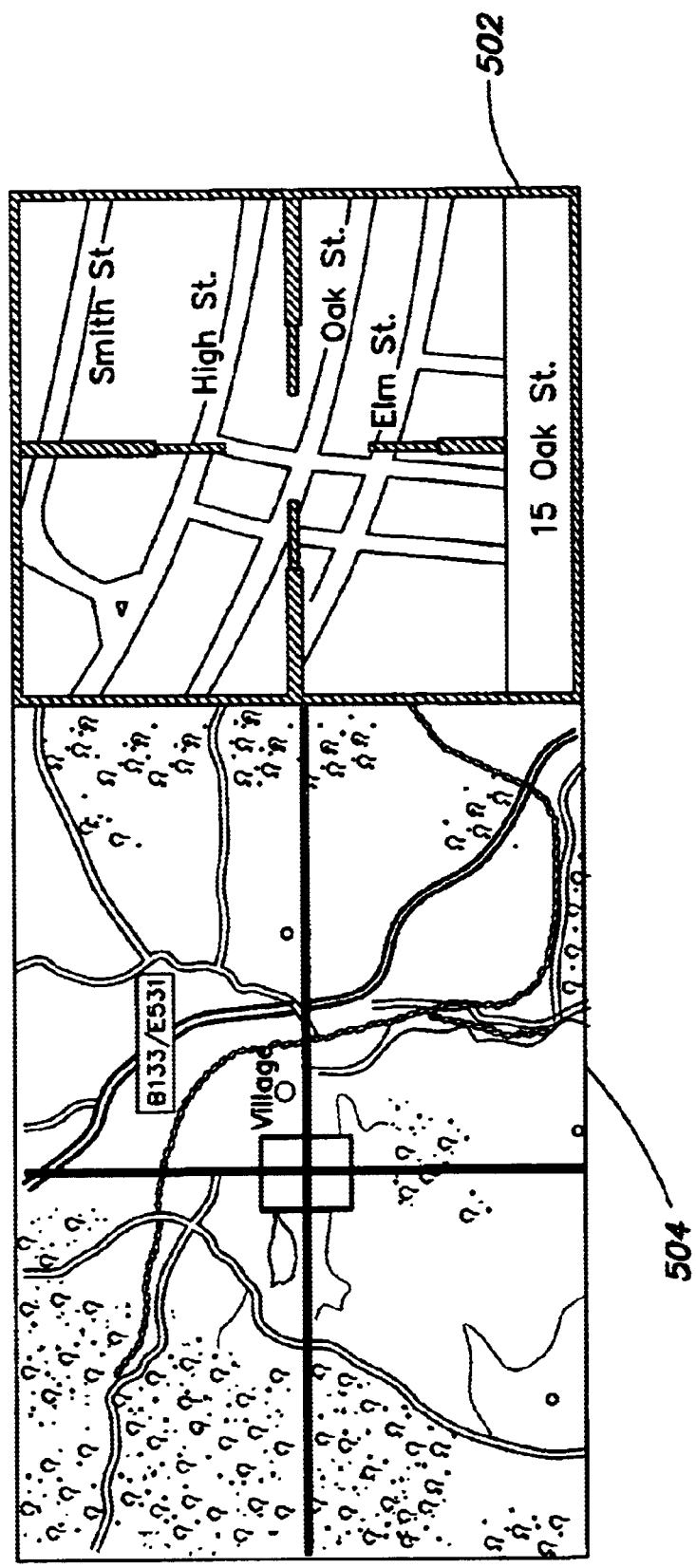
FIG. 5 is a pictorial illustration of a display screen that includes an enlarged selected map section in a help window adjacent to a general map.

Step 220 is then performed to simultaneously display the general image and the image of the selected map location. The images can be displayed by superimposing the image of the selected map location over the general map image, or displaying the two images adjacent to one another. For example, FIG. 4 is a pictorial illustration of a display screen that includes an enlarged selected map section 402 superimposed over a portion of general map 404. In an alternative embodiment, rather than superimposing the selected portion image over the general map image as shown in FIG. 4, the selected portion image can be displayed adjacent to the general map image as shown in FIG. 5. For example, FIG. 5 is a pictorial illustration of a display screen that includes an enlarged selected map section 502 in a help window adjacent to a general map image 504.

As shown in FIG. 4, selected section 402 is superimposed in position on the general map or, as shown in FIG. 5, is placed beside the general map in a help window. The section of the general map reproduced on an enlarged scale in the help window as shown in FIG. 5 is in a box for easier viewing. Using the movable pointing device (e.g., the crosshairs ) controlled via the operating unit 112, the operator can move both the general map and the enlarged section of the general map up, down, right or left (e.g., in all eight directions) as desired.

Referring again to FIG. 2, in step 222 the navigation computer 104 of the navigation unit 102 calculates the route from a starting point, entered by the operator via the operating unit 112, leading to a destination that is also entered via the operating unit 112, and the route is displayed on the screen 110.

The screen memory 118 is preferably divided into two levels. Map data for the area of the general map to be displayed are stored in one level, while the maps for the enlarged section are stored in the other level. The graphic control unit 120 generates the images to be displayed on the screen 110 from the map data stored in the screen memory 118.

In this manner, any route from a starting point to a destination, optimizable according to presettable criteria, can be calculated and displayed on the screen 110 without continuous switching between the scroll function and the zoom function, as both the general map and the enlarged section are displayed simultaneously on the screen. The navigation system according to the invention is thus characterized by simple operation and rapid calculation and display of routes.

Although the present invention has been shown and described with respect to several preferred embodiments thereof, various changes, omissions and additions to the form and detail thereof, may be made therein, without departing from the spirit and scope of the invention.

What is claimed is:

1. Method for navigation using a navigation system that includes (i) a memory for storing map data, (ii) a navigation computer to calculate routes, (iii) an operating unit for entering a starting point and a destination, (iv) a screen for scrolling maps, (v) crosshairs for selecting a destination or destination area, and (vi) a zoom function for displaying a section of an enlarged-scale map selectable by the crosshairs, characterized in that map data from larger- and smaller-scale maps are stored in the memory, are selected by the crosshairs on a smaller-scale general map displayed on the screen, and are displayed on the screen on an enlarged scale at the same time as the general map.

2. Method according to claim 1, characterized in that the large-scale map section is superimposed in position on the general map on screen.

3. Method according to claim 1, characterized in that the larged-scale map section is displayed in a help window beside, above, or below the general map on screen.

4. Method according to claim 3, characterized in that a screen control unit comprises a memory, a main computer, and a graphic control unit, in that the main computer calculates the area of the general map to be displayed on the screen and then the selected section, in that the calculated area of the general map and the section are displayed simultaneously on screen, and in that the calculated area of the general map and the section can be moved synchronously with each other on screen by means of graphic control unit.

5. Method according to claim 4, characterized in that a screen memory is provided, which is divided into two levels, with map data for the area of the general map to be displayed being stored in one level and the map data for the enlarged section being stored in the other level, and in that the graphic control unit generates the images on the screen from the map data stored in screen memory.

6. A navigation system with a memory for storing map data, with a navigation computer for calculating routes, with an operating unit for entering a starting point and a destination, with a screen for scrolling maps, with crosshairs for selecting a destination or destination area, and with a zoom function for enlarging a selectable portion of a map on a larger scale, characterized in that map data from larger- and smaller-scale maps are stored in the memory, and in that a section is selectable by the crosshairs from a smaller-scale general map displayed on the screen, and can be displayed on the screen on an enlarged scale at the same time as the general map.

7. Navigation system according to claim 6, characterized in that the large-scale map section can be superimposed in position on the general map on screen.

8. Navigation system according to claim 6, characterized in that the large-scale map section can be displayed in a help window beside, above, or below the general map on screen.

9. Navigation system according to claim 8, characterized in that a screen control unit is provided with a memory, a main computer, and a graphic control unit, in that the area of the general map to be displayed on screen followed by the selected selection can be calculated by the main computer, and in that the calculated area of the general map and the selectable section can be displayed simultaneously on the screen and the calculated area of the general map and the selectable section can be moved synchronously with each another on the screen by means of graphic control unit.

10. Navigation system according to claim 9, characterized in that a screen memory is provided, which is divided into two levels, with map data for the area of the general map to be displayed being stored in one level and the maps for the enlarged section being stored in the other level, and in that the images on the screen can be generated from the map data stored in screen memory by means of the graphic control unit.

11. Navigation system according to claim 10, characterized in that the screen control unit is connected to the screen and operating unit and in that the screen control unit is connected via a data bus with a navigation unit that is equipped with navigation computer.

12. A method of providing and displaying a general map image and a more detailed section map image in a navigation system for use in a motor vehicle, said method comprising:

generating and displaying the general map image;

determining the position of a user controlled movable reference point displayed on the general map image, and providing a position signal indicative of the location of the movable reference point on the general map image; and generating the section map image in response to the position signal and displaying the section map image together with at least a portion of the general map image, wherein the section map section is indicative of the area associated with the position signal.

13. The method of claim 12, wherein said step of displaying the general map image comprises superimposing the section map image over the general map image in the location of the movable reference point.

14. The method of claim 12, wherein said step of displaying the general map image comprises displaying the section map image adjacent to the at least a portion of the general map image.

15. The method of claim 12, wherein said step of displaying the general map image comprises displaying the section map image adjacent to the general map image.

16. The method of claim 12, wherein said section map image and said at least a portion of said general map are displayed together on the same display.

17. A system for use in a motor vehicle navigation system, said system comprising:

a display;

a screen control unit that generates a first map image and outputs said first map image to said display; and a manually controllable pointing device that generates and provides a movable reference point displayed on said first map image, wherein said screen control unit determines the position of said movable reference point displayed on said first map image and generates a position signal indicative thereof, and generates a second map image in response to said position signal and displays said second map image on said display together with at least a portion of the first map image, wherein said second map image is indicative of the area associated with said position signal and the scale of said first map image is different than the scale of said second map image.

18. The system of claim 17, wherein said second map image is superimposed over at least a portion of the first map image in the location of the movable reference point.

19. The system of claim 17, wherein said second map image is displayed adjacent to at least a portion of said first map image on said display.

20. The system of claim 17, wherein said second map image is displayed in a scale that is more detailed than the first map image.

21. A system for use in a motor vehicle navigation system that provides navigation information on a display, said system comprising:

a screen control unit that generates a first map image and outputs said first map image to the display; and a pointing device that generates and provides a user controlled movable reference point that is displayed on said first map image, wherein said screen control unit determines the position of said user controlled movable reference point displayed on said first map image and generates a position signal indicative thereof, and generates a second map image in response to said position signal and displays said second map image on the display together with at least a portion of the first map image, wherein said second map image is indicative of the area associated with said position signal and said second map image is displayed in a scale that is more detailed than the first map image.

* * * * *

UNITED STATES PATENT AND TRADEMARK OFFICE
CERTIFICATE OF CORRECTION

PATENT NO. : 6,898,523 B2
DATED : May 24, 2005
INVENTOR(S) : Cochlovius et al.

It is certified that error appears in the above-identified patent and that said Letters Patent is hereby corrected as shown below:

<u>Column 4,</u>
Line 18, delete "larged" and insert -- large --

Signed and Sealed this

Nineteenth Day of July, 2005

JON W. DUDAS
*Director of the United States Patent and Trademark Office*